A. HOILAND.
COMBINED WILD OATS SEPARATOR AND GRAIN SEPARATOR AND CLEANER.
APPLICATION FILED SEPT. 5, 1914.
1,177,703.
Patented Apr. 4, 1916.
2 SHEETS—SHEET 2.
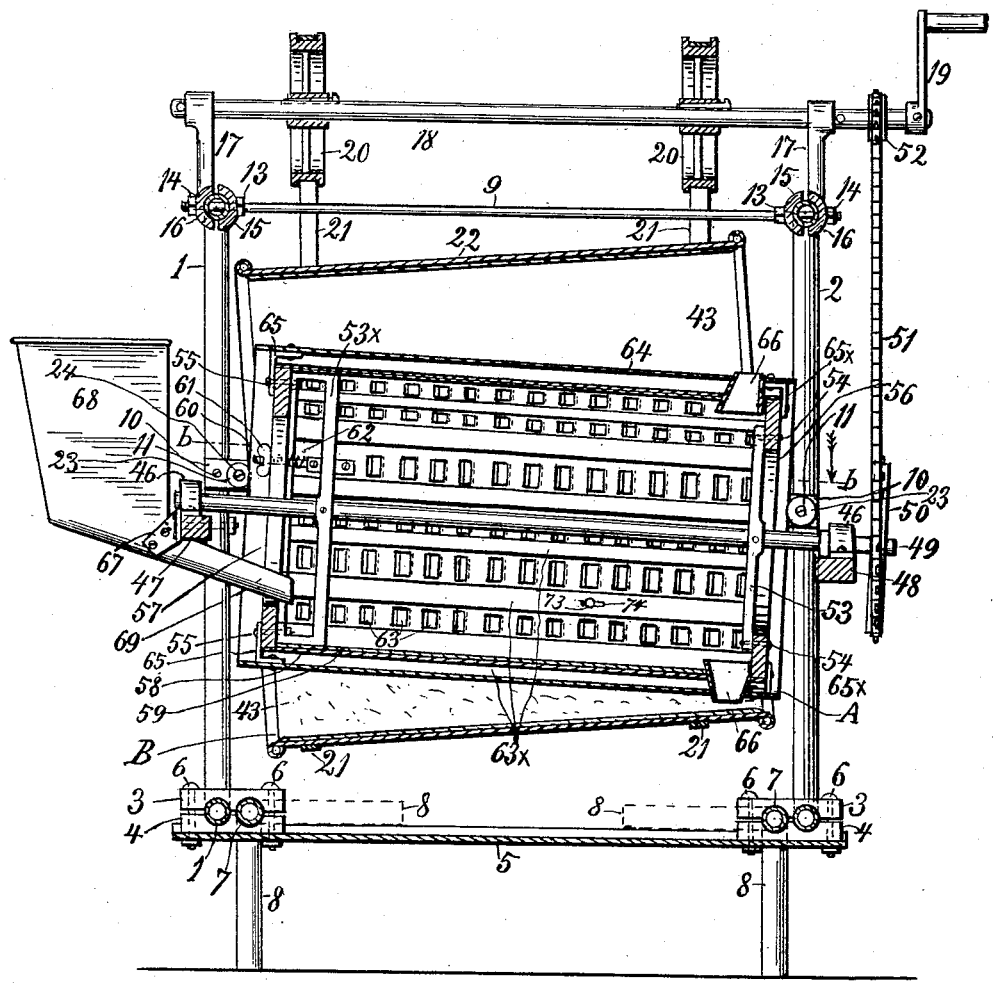
FIG. 3.
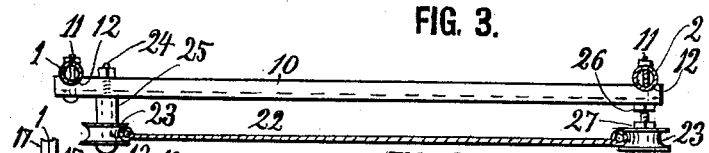
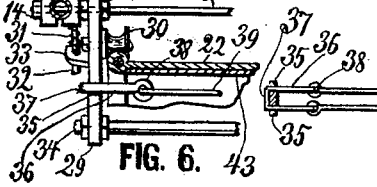
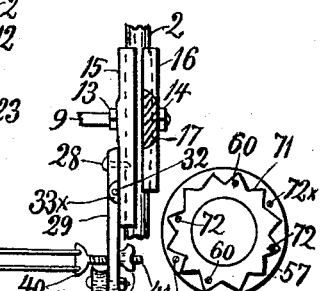
WITNESSES:
A. E. Carlsen.
S. Carlsen.
INVENTOR:
Albert Hoiland
BY his ATTORNEY:
A. M. Carlsen

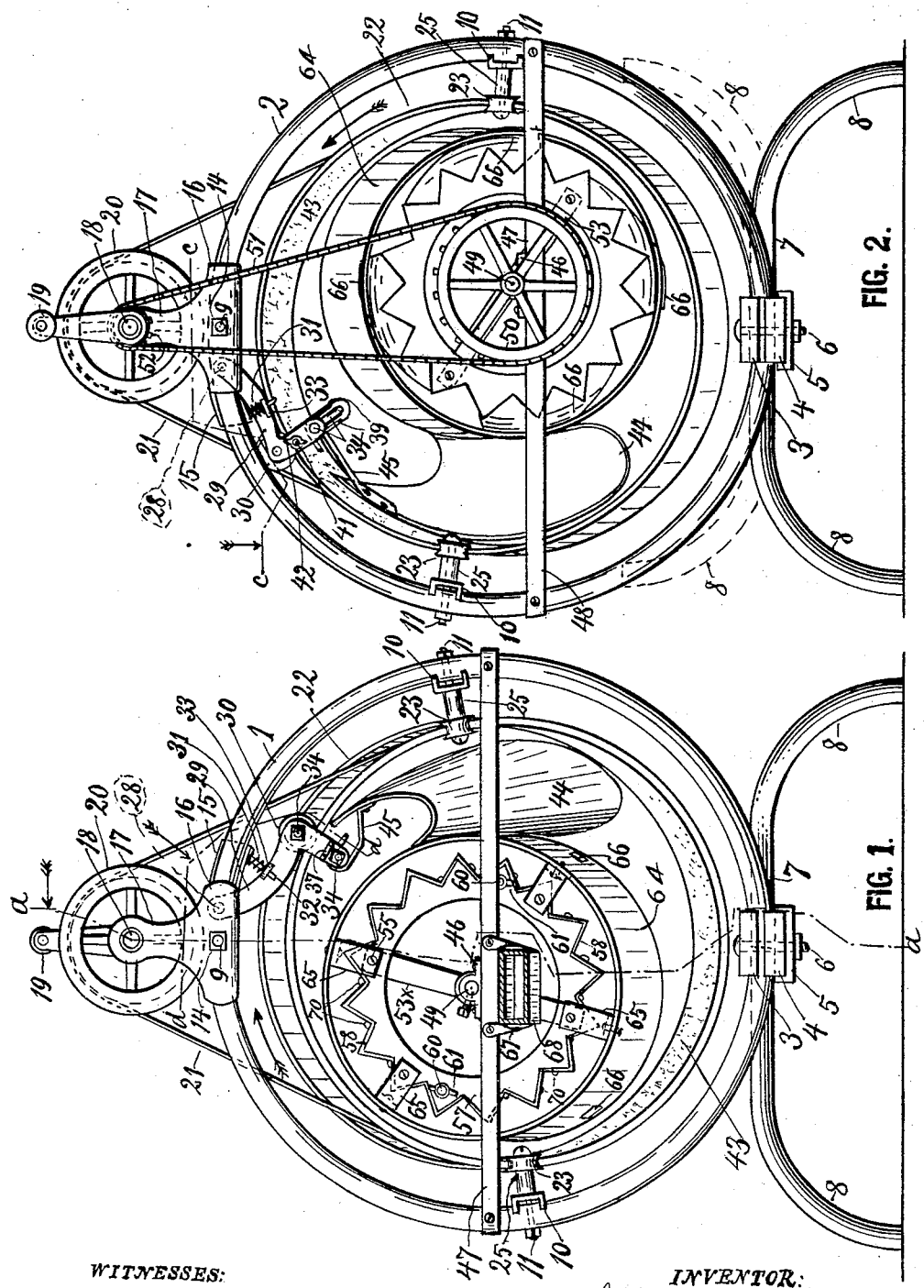

UNITED STATES PATENT OFFICE.

ALBERT HOILAND, OF NOME, NORTH DAKOTA.

COMBINED WILD-OATS SEPARATOR AND GRAIN SEPARATOR AND CLEANER.

1,177,703. Specification of Letters Patent. Patented Apr. 4, 1916.

Application filed September 5, 1914. Serial No. 860,495.

*To all whom it may concern:*

Be it known that I, ALBERT HOILAND, a citizen of the United States, residing at Nome, in the county of Barnes and State of North Dakota, have invented a new and useful Combined Wild-Oats Separator and Grain Separator and Cleaner, of which the following is a specification.

My invention relates to improvements in devices for separating wild oats, quack grass seeds and other weed seeds from cultivated oats, wheat, flax, barley and rye, and it consists of the combinations, constructions and arrangements herein described and claimed.

The main object of the invention is to provide a machine which in a single operation will separate all kinds of weeds including cockles, wild oats, quack grass, &c., from wheat, barley, rye, oats and other grain, and which may also by a second operation separate or grade wheat or other grain into large and small *Cerealia*.

Another object is to make certain improvements upon the wild oats separator covered by my United States Patent No. 1,054,549, issued on the 25th day of February, 1913.

A third object is to make improvements in general upon a machine of the class referred to and which will now be described.

In the accompanying drawings,—Figure 1 is a front end elevation of my improved machine with most of the feed hopper 68 broken away. Fig. 2 is a rear end elevation of the machine. Fig. 3 is a longitudinal section substantially on the line $a-a$ Fig. 1. Fig. 4 is a section on the line $b-b$ Fig. 3, showing the outer cylinder and the adjacent portion of the frame and guide pulleys on same. Fig. 5 is a section on the line $c-c$ Fig. 2 showing only certain parts and with a slight modification. Fig. 6 is a section about as on the line $d-d$ Fig. 1, showing certain parts only and a slight modification. Fig. 7 shows the inner side of one of the end pieces of the inner cylinder of the device modified.

Referring to the drawings by reference numerals, the main frame of the machine is composed of two rings, 1 and 2, preferably formed of iron pipes and having each its meeting ends clamped in grooves of blocks 3, 4, placed in the groove of a longitudinal bar of channel iron, 5, bolts 6 securing said blocks and bar together. Between said blocks are also clamped in other meeting grooves arched tubes or bars 7, whose downwardly curved end portions constitute the legs 8 of the machine. The latter arrangement enables the legs to be folded as shown in dotted lines 8 in Fig. 3, or even upward as in Fig. 2 during storage and transportation.

The rings 1 and 2 are secured together by said bottom bar 5, top bar 9, and one or two side bars 10, each of which is secured by bolts 11 to the rings and provided with notches 12 (see Fig. 4) gripping firmly the rings; said bar or bars 10 are preferably made of channel iron, as shown in Figs. 1 and 2. The top bar 9 has each end passed through one of the rings of the frame and provided with two nuts, 13, 14, between which are clamped against the ring two grooved members 15, 16, the latter of which having an upward projection 17 forming the journal bearing for an operating shaft 18, having a crank 19, which crank represents any suitable means for rotating the shaft.

Secured on the shaft 18 are two pulleys 20, with belts 21, by which is suspended and rotated an outer cylinder 22; said cylinder is guided by grooved pulleys 23 mounted on the frame either on special studs as 24 to the left in Fig. 4, threaded in the bar 10 and having a spacing collar 25, or on the same bolt 11 that secures the bar 10 to the ring, as shown to the right in Fig. 4, where the bolt 11 has two extra nuts, 26, 27 and forms the stud on which the pulley 23 is mounted. To further steady the large cylinder 22 and keep its belts 21 stretched, I pivot at 28 to each of the clamp members 15 an L-shaped lever 29, and provide such lever with a grooved pulley 30 which bears upon the upper edge of the cylinder, said lever being constantly pressed downward by a spring 31 placed on a guide 32 and partly compressed between a lug 33 on the lever and a projection of the clamp member 15, from which the guide 32 projects. In some cases the lug 33 may be on the clamp member, as indicated by $33^x$ in Fig. 5, and the guide projecting upward through it from the lever 29. In Fig. 6 is also shown that the lever 29 may be mounted on the bar 9 between the nut 13 and an extra nut $13^x$ instead of on the pivot 28 as in Figs. 1, 2 and 5.

The short downward arms of the L-shaped lever 29 are secured together by a rod 34, and above said rod one lever is provided with two opposite notches 35 (see Figs. 5 and 6) in which are placed the parallel arms 36 of a comparatively heavy clevis 37, in whose I-shaped ends 38 one end of each of two light wires 39 are secured; the other ends of said wires are secured in a stretcher piece 40 having a threaded shank 41 passed through the other lever 29 and provided with a thumb-nut 42. This arrangement enables the wires 39 to be stretched at any time by the nut 42, and the piece 40 and the clevis arms 36 serve as buffers of heavier materials than the wires against the inner sides of the reduced end portions of the cylinder so it cannot contact with the light wires 39 and wear them out when it vibrates during its rotation.

The cylinder 22 hangs in an inclined position, and is lined inside with flannel or similar cloth, 43, presenting a surface to which the sharp projections of the wild oats will stick and carry such oats around with the cylinder until dislodged by being carried against the wires 39 extending through the upper part of the cylinder and acting as scrapers. When the wild oats are thus dislodged they drop into an inclined chute 44, which is suspended by hangers or hooks 45 from the rod 34 and guides the wild oats out of the machine through the highest end of the cylinder, while from the lowest end of it is discharged the cleaned wheat or other grain. This operation was the only action in my former machine above referred to, and the mixed grain and wild oats were delivered by a hopper directly into the single cylinder, while in the present machine I arrange within said main cylinder the following mechanism: Mounted in bearings 46 upon transverse frame bars 47, 48, toward one side in the outer cylinder is a shaft 49, rotated by a sprocket 50 fixed on it and a chain 51 and a smaller sprocket 52 fixed on the shaft 18. Fixed on said shaft 49 are two spiders, which may be simply diametrical bars, 53 53ˣ, to whose ends are secured by bolts 54, 55 two annular bottoms or end pieces, 56, 57, of a corrugated sheet metal cylinder composed of an outer member 58 secured to the end pieces and an inner member 59 slidably fitted in the outer member and adjustable therein by having two threaded arms 60 secured to it and extended through holes in one of the end pieces, and there beyond provided each with a thumb-nut 61, while inside the end piece a spring 62 is partly compressed between the end piece and a shoulder on the threaded arm which the spring encircles. Both members are in one side of each corrugation provided with perforations 63, which normally corresponds over each other but may be reduced in size by turning the thumb nuts in one direction, and enlarged again by a reverse turning of the nuts so as to let the springs 62 push the inner member of the cylinder back again toward normal position. Concentrically spaced about the corrugated cylinder is an imperforated sheet metal cylinder or shell 64, which has its ends secured to the perforated cylinder by brackets 65 and 65ˣ, the brackets 65ˣ may be omitted as in Fig. 2 and the lower end of the cylinders secured together by the lateral spouts 66 which extend from the lower end of the perforated cylinder and may be of any desired number; in the drawings I have shown two in Fig. 3 and Fig. 1, and four in Fig. 2. Secured on the frame bar 47 by brackets 67, or otherwise secured on the frame, is a hopper 68 having a spout 69 projected into the upper end of the perforated cylinder. To avoid contact of said spout with the bar 53ˣ the latter is offset near its ends and thereby disposed some distance into the cylinder it supports.

The outer member of the perforated cylinder may be secured to its end portions in various manners; thus in Fig. 1 is shown how the member 58 may be secured by screws 70 about the end piece 57, while in Fig. 7 is shown that each head may be circular and provided with a zig-zag groove 71 for the insertion of the ends of the outer member of the cylinder, and the heads are then secured together by rods 72, or 72ˣ, and the stems 60 moving the inner corrugated member are arranged as shown.

In the operation of the complete device, the wheat or other grain to be cleaned is shoveled into the hopper 68 and the shaft 18 rotated by a crank or other available power; as the perforated cylinder and the outer cylinders rotate in the same direction but it may be at more or less different speeds, the mixed grain is delivered into the corrugated cylinder, and as the latter rotates the grain is precipitated from each of the blank portions 63ˣ down upon the perforated portions of the cylinder 59 while moving also toward the lower end of said cylinder; said movements cause the cockles, orrach and all other weeds, except wild oats, to drop through the perforations and be discharged from the machine by the cylinder shell 64, while the wheat or other useful grain and the wild oats pass out of the spouts or outlets 66 and are separated by the cylinder 22, the scraping wires 39 and the chute 44, as already described. The wheat, oats, barley or rye thus cleaned may be separated or graded into small and large grain by passing the same a second time through the machine with the perforations in the inner cylinder so adjusted that only the small grain can pass through it and is discharged at A, while the large grain moves along and out of the spouts 66 and is discharged from the machine at B. Suitable special chutes (not shown) may be arranged for conveying from the machine the grain and other seeds delivered by it.

During the storing and especially during transportation of the machine the legs 8 may be folded as already stated; and by removing the nuts 14 the bearings 17, shaft 18 and chain 51 may be detached and boxed or otherwise so placed that they are less liable to get damaged than if left on the top of the machine. If so desired the pulleys 20 may be detached from the shaft 18 and said parts may then be placed inside the cylinders of the machine, so that the whole machine will occupy but little space when thus folded and prepared for shipping. When the bearings 17 are removed the nuts 14 are adjusted against the rings 1 and 2 of the frame. In Fig. 3 is shown how headed studs 73 in one cylinder member are guided in slots 74 of the other member.

From the above description it will be seen that I provide a comparatively simple single machine with a single frame and containing in compact form means whereby a single operation will do the work of several machines and several operations, thus saving material and labor in the manufacture, and labor and time in the operation of the machine. I also produce a compact machine easy to fold into a small space and not liable to get broken during transportation.

What I claim is:

1. In a machine of the class described and mounted in a suitable frame, a main cylinder open at both ends and having its inner side covered with material adapted to engage the sharp projections of wild oats, a second and smaller open-ended cylinder spaced from and rotatable inside the main cylinder, said cylinders being in eccentric relation to one another and inclined in opposite directions, and said smaller cylinder having its lower end provided with an internal circular rim; means for rotating both cylinders simultaneously, means for removing the wild oats from the large cylinder, means for feeding the mixed grain into the upper end of the small cylinder; said small cylinder comprising two cylindrical members concentrically spaced one outside the other, the inner member being a sieve and having near its lower end radial spouts extending through the outer and imperforate member.

2. In a machine of the class described and mounted in a suitable frame, a main cylinder open at both ends and having its inner side covered with material adapted to engage the sharp projections of wild oats, a second and smaller open-ended cylinder spaced from and rotatable inside the main cylinder, said cylinders being in eccentric relation to one another and inclined in opposite directions, and said smaller cylinder having its lower end provided with an internal circular rim; means for rotating both cylinders simultaneously, means for removing the wild oats from the large cylinder, and means for feeding the mixed grain into the upper end of the small cylinder; said small cylinder comprising two cylindrical members concentrically spaced one outside the other, the inner member being a sieve with adjustable perforations and having near its lower end radial spouts extending through the outer and imperforate member.

3. In a machine of the class described and mounted in a suitable frame, the combination with an open-ended inclined cylinder having its inner side provided with a lining to which the projections of wild oats will stick, levers pivoted on the frame and depending one near each end of the cylinder, a rod connecting said levers and extending through the cylinder, an inclined chute suspended from said rod, and above said rod extending between the levers scraping wires arranged to loosen the wild oats from the cylinder lining and let them drop into the chute, said wires having at each end a connecting piece of heavier material than the wires proper, one of said connecting pieces comprising means for adjusting the tension of the wires.

In testimony whereof I affix my signature in presence of two witnesses.

ALBERT HOILAND.

Witnesses:
L. Hogstadt,
C. E. Doppin.